(12) United States Patent
Guo et al.

(10) Patent No.: US 10,274,970 B2
(45) Date of Patent: Apr. 30, 2019

(54) METHOD, AND DEVICE FOR CONTROLLING THE OUTPUT OF THE AIR VOLUME AND MEMORY MEDIUM

(71) Applicant: ZTE Corporation, Shenzhen (CN)

(72) Inventors: Yulong Guo, Shenzhen (CN); Minbo Zhu, Shenzhen (CN); Chengfu Jiang, Shenzhen (CN); Xiongxiong Hu, Shenzhen (CN); Fan Liu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 171 days.

(21) Appl. No.: 15/037,786

(22) PCT Filed: Nov. 19, 2014

(86) PCT No.: PCT/CN2014/091696
§ 371 (c)(1),
(2) Date: May 19, 2016

(87) PCT Pub. No.: WO2015/074573
PCT Pub. Date: May 28, 2015

(65) Prior Publication Data
US 2016/0291605 A1 Oct. 6, 2016

(30) Foreign Application Priority Data
Nov. 21, 2013 (CN) .......................... 2013 1 0593534

(51) Int. Cl.
*G05D 7/06* (2006.01)
*G11B 33/14* (2006.01)
(Continued)

(52) U.S. Cl.
CPC ............ *G05D 7/0635* (2013.01); *F24F 11/30* (2018.01); *F24F 11/74* (2018.01); *F24F 11/76* (2018.01);
(Continued)

(58) Field of Classification Search
CPC ........... G05D 7/0635; G05D 23/11919; G05D 23/1919; F24F 11/74; F24F 11/76;
(Continued)

(56) References Cited

U.S. PATENT DOCUMENTS 4,732,318 A * 3/1988 Osheroff ............... F24F 3/0442
236/49.3
5,025,638 A 6/1991 Yamagishi
(Continued)

FOREIGN PATENT DOCUMENTS

CN 1129308 A 8/1996
CN 101236001 A 8/2008
(Continued)

OTHER PUBLICATIONS

Supplementary European Search Report in European application No. 14864928.8, dated Jan. 19, 2017.
(Continued)

*Primary Examiner* — Tan T. Nguyen
(74) *Attorney, Agent, or Firm* — Oppedahl Patent Law Firm LLC

(57) ABSTRACT

Disclosed are a method, device for controlling the output of the air volume and a memory medium. The method includes: determining the temperature difference value according to the current temperature value and the preset temperature value of a cabinet; controlling the opening of an air valve of a variable air volume terminal according to the temperature difference value, so as to adjust the air volume needed by the cabinet. The temperature value needed to be adjusted is
(Continued)

determined according to the difference value between the current temperature value and the preset temperature value. The opening of the air valve of the variable air volume terminal is correspondingly adjusted according to the temperature value needed to be adjusted, so as to adjust the air volume needed by the cabinet, and adjust the air volume according to the actual demand.

18 Claims, 4 Drawing Sheets

(51) Int. Cl.
| | |
|---|---|
| G05B 11/42 | (2006.01) |
| G05D 23/19 | (2006.01) |
| F24F 11/30 | (2018.01) |
| F24F 11/83 | (2018.01) |
| F24F 11/74 | (2018.01) |
| F24F 11/76 | (2018.01) |
| F24F 110/10 | (2018.01) |
| F24F 11/63 | (2018.01) |
| F24F 11/84 | (2018.01) |

(52) U.S. Cl.
CPC .............. *F24F 11/83* (2018.01); *G05B 11/42* (2013.01); *G05D 23/1919* (2013.01); *G11B 33/142* (2013.01); *F24F 11/63* (2018.01); *F24F 11/84* (2018.01); *F24F 2110/10* (2018.01)

(58) Field of Classification Search
CPC ........... F24F 11/83; F24F 11/30; G05B 11/42; G11B 33/142
USPC ................................ 700/282, 276, 277, 278
See application file for complete search history.

(56) References Cited

U.S. PATENT DOCUMENTS

| | | | |
|---|---|---|---|
| 5,076,346 A | 12/1991 | Otsuka | |
| 5,344,069 A | 9/1994 | Narikiyo | |
| 7,259,963 B2 | 8/2007 | Germagian | |
| 7,403,391 B2 | 7/2008 | Germagian | |
| 7,857,233 B2* | 12/2010 | Trantham | F24D 19/1015 236/1 C |
| 2005/0011208 A1 | 1/2005 | Dobbs | |
| 2006/0139877 A1 | 6/2006 | Germagian | |
| 2007/0146994 A1 | 6/2007 | Germagian | |
| 2009/0032236 A1* | 2/2009 | Geadelmann | F24F 1/0007 165/270 |
| 2010/0163633 A1* | 7/2010 | Barrett | B60H 1/00871 236/49.3 |
| 2011/0270446 A1* | 11/2011 | Scharf | F24F 11/0001 700/282 |
| 2012/0118986 A1 | 5/2012 | Dazai | |
| 2012/0192955 A1* | 8/2012 | Dazai | F24F 3/044 137/2 |
| 2013/0158722 A1* | 6/2013 | Chen | G05D 23/19 700/276 |
| 2013/0273825 A1 | 10/2013 | Uno et al. | |
| 2013/0304263 A1* | 11/2013 | Liu | F27D 19/00 700/281 |
| 2014/0222241 A1* | 8/2014 | Ols | G05B 15/02 700/299 |
| 2015/0208553 A1* | 7/2015 | Bauchot | H05K 7/20745 361/679.47 |
| 2015/0233597 A1* | 8/2015 | Dempster | F24F 11/83 165/11.2 |
| 2015/0257311 A1* | 9/2015 | Palmer | H05K 7/20836 700/276 |
| 2016/0054741 A1* | 2/2016 | Thuillard | F24F 11/008 700/276 |
| 2016/0116177 A1* | 4/2016 | Sikora | F24F 11/30 165/11.2 |
| 2016/0187021 A1* | 6/2016 | Harayama | F24F 11/30 236/1 C |
| 2017/0082683 A1* | 3/2017 | Krystad | G01R 31/2875 |
| 2017/0146261 A1* | 5/2017 | Rogers | F24F 11/0012 |

FOREIGN PATENT DOCUMENTS

| | | |
|---|---|---|
| CN | 201935340 U | 8/2011 |
| CN | 102538148 A | 7/2012 |
| CN | 102788410 A | 11/2012 |
| CN | 103237439 A | 8/2013 |
| GB | 2261964 A | 6/1993 |
| JP | 4337427 B2 | 9/2009 |
| JP | 2011226737 A | 11/2011 |
| JP | 2013047577 A | 3/2013 |
| JP | 2013204957 A | 10/2013 |
| WO | 2012081092 A1 | 6/2012 |

OTHER PUBLICATIONS

Cao, Jianqiu et al., "Compound Control Strategy of Fuzzy + Variable Universe Self-adaptive Fuzzy-PID Based on Genetic Algorithm Optimization", Information and Control, vol. 40, No. 01, Feb. 28, 2011 (Feb. 28, 2011), p. 45, right column, lines 1-20.

International Search Report in international application No. PCT/CN2014/091696, dated Feb. 27, 2015.

English Translation of the Written Opinion of the International Search Authority in international application No. PCT/CN2014/091696, dated Feb. 27, 2015.

* cited by examiner

METHOD, AND DEVICE FOR CONTROLLING THE OUTPUT OF THE AIR VOLUME AND MEMORY MEDIUM

TECHNICAL FIELD

The embodiments of the present disclosure relate to a communication and control technology, and in particular to a method and device for controlling an output air volume and a storage medium.

BACKGROUND

With the rapid development of mobile communication and the Internet, the demand for constructing a machine room is increased significantly, a ratio of power consumption for cooling a core machine room or a data centre to overall power consumption is increased, electric charges account for more in running cost of a telecommunication enterprise, and power saving becomes an important means for a telecommunication enterprise to cut down running cost. An annual heat load of a communication machine room is high, so that an air conditioner dedicated for the machine room is required to continuously run to ensure environmental parameters of the machine room. Power consumption during running of communication equipments is continuous and necessary, and environmental temperature of the machine room may be flexibly regulated according to the actual demand, so that power consumption of the air conditioning system of the machine room is the key for energy saving of the communication machine room.

At present, main methods for controlling energy saving of a communication machine room are focusing on optimal designs of air flow distribution of the machine room, cold and heat layouts of parallel cabinets, selection of manners for upward and downward air supply, reasonable designs of widths of intervals and passages between the cabinets, improvement of a control manner for an air conditioner of the machine room and the like, and cannot regulate an air volume according to a actual workload of the machine room.

SUMMARY

The embodiments of the present disclosure provide a method and device for controlling an output air volume and a storage medium which solve the problem that main methods for controlling energy saving of a communication machine room in the prior art are focusing on designs and layouts of air flow distribution of the machine room and cannot regulate an air volume according to a actual workload of the machine room.

In order to solve the above described technical problem, in an aspect, an embodiment of the present disclosure provides a method for controlling an output air volume including: determining a temperature difference according to a current temperature value of a cabinet and a preset temperature value of the cabinet; and controlling an opening degree of an air valve of a variable air volume terminal device of the cabinet according to the temperature difference, to regulate a magnitude of an air volume required by the cabinet.

In an embodiment, the step of controlling the opening degree of the air valve of the variable air volume terminal device of the cabinet according to the temperature difference may include controlling the opening degree of the air valve of the variable air volume terminal device of the cabinet by a variable universe adaptive fuzzy Proportion Integration Differentiation (PID) control method according to the temperature difference.

In an embodiment, the method may further include: after the step of controlling the opening degree of the air valve of the variable air volume terminal device of the cabinet according to the temperature difference, detecting a magnitude relationship between the temperature difference of the cabinet and a preset threshold value according to a preset detection period, wherein the preset threshold value is a range by which the temperature is allowed to change; increasing or decreasing the opening degree of the air valve of the variable air volume terminal device of the cabinet to regulate a magnitude of a value of an input air volume if the temperature difference is out of the range of preset threshold value; and maintaining the opening degree of the air valve of the variable air volume terminal device of the cabinet for the current detection period if the temperature difference is within the range of the preset threshold value.

In an embodiment, the method may further include: before the step of determining the temperature difference according to the current temperature value of a cabinet and a preset temperature value of the cabinet, acquiring a current temperature of the cabinet by a temperature sensor according to a preset detection period; or acquiring the current temperature of the cabinet in real time by the temperature sensor.

In an embodiment, the method may further include: after the step of controlling the opening degree of the air valve of the variable air volume terminal device of the cabinet according to the temperature difference, acquiring opening degrees of the air valves of the variable air volume terminal device of all cabinets being detected in a machine room; and regulating a total air volume required by the machine room according to the opening degrees of respective air valves of the variable air volume terminal devices.

In an embodiment, the method may further include: after the step of regulating the total air volume required by the machine room according to the opening degrees of respective air valves of the variable air volume terminal devices, acquiring a maximum $P_{max}$ for a valve position corresponding to the opening degree of each air valve of the variable air volume terminal device; increasing a rotating speed of a fan by a preset step length, if $P_{max}>$a first threshold value and the rotating speed of the fan is lower than a maximum rotating speed; reducing the rotating speed of the fan by a preset step length if $P_{max}<$a second threshold value; and maintaining a value of current air volume if the second threshold value$\leq P_{max}\leq$the first threshold value.

In another aspect, an embodiment of the present disclosure further provides a device for controlling an output air volume including: a determination module configured to determine a temperature difference according to a current temperature value of a cabinet and a preset temperature value of the cabinet; and a control module configured to control an opening degree of an air valve of a variable air volume terminal device of the cabinet according to the temperature difference to regulate a magnitude of an air volume required by the cabinet.

In an embodiment, the control module may include a control unit configured to control the opening degree of the air valve of the variable air volume terminal device of the cabinet by a variable universe adaptive fuzzy PID control method according to the temperature difference.

In an embodiment, the device may further include: a detection module configured to detect a magnitude relationship between the temperature difference of the cabinet and a preset threshold value according to a preset detection period, wherein the preset threshold value is a range by which the temperature is allowed to change; and a regulation module configured to increase or decrease the opening degree of the air valve of the variable air volume terminal device of the cabinet to regulate a magnitude of a value of an input air volume if the temperature difference is out the range of the preset threshold value, and maintain the opening degree of the air valve of the variable air volume terminal device of the cabinet for the current detection period if the temperature difference is within the range of the preset threshold value.

In an embodiment, the device may further include a wireless data transmission module configured to acquire a current temperature of the cabinet by a temperature sensor according to a preset detection period, or to acquire the current temperature of the cabinet in real time by the temperature sensor.

A storage medium storing therein a computer program configured to execute the aforementioned method for controlling an output air volume is provided.

According to the embodiments of the present disclosure, the temperature value to be regulated is determined according to the difference between the current temperature value and the preset temperature value, and the opening degree of the air valve of the variable air volume terminal device is accordingly regulated according to the temperature value to be regulated to regulate the magnitude of the air volume required by the cabinet so as to further regulate the air volume according to the actual demand, so that the problem that the main methods for controlling energy saving of the communication machine room in the prior art are focusing on designs and layouts of air flow distribution of the machine room and cannot regulate the air volume according to the actual workload of the machine room is solved.

DETAILED DESCRIPTION

In order to solve the problem that main methods for controlling energy saving of a communication machine room in the prior art are focusing on designs and layouts of air flow distribution of the machine room and cannot regulate an air volume according to a actual workload of the machine room, the present disclosure provides a method and device for controlling an output air volume, and will be further described in detail with reference to the appended drawings and embodiments. It should be understood that the specific embodiments described herein are only intended to explain the present disclosure and not to limit the present disclosure.

Figure 1:
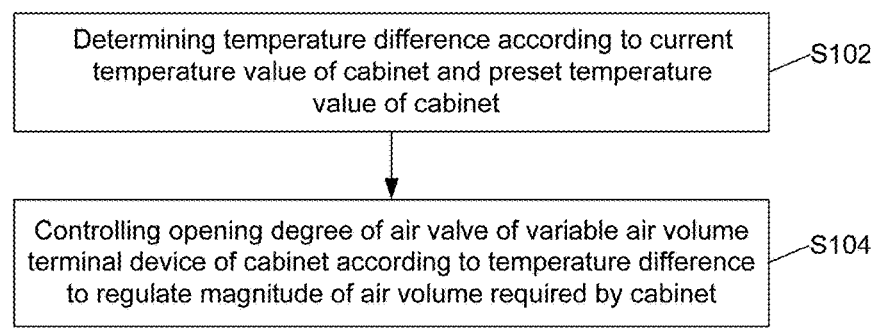
FIG. 1 is a flowchart of a method for controlling an output air volume according to an embodiment of the present disclosure.

The embodiment of the present disclosure provides a method for controlling an output air volume, the flow of which includes Steps 102-104 as shown in FIG. 1.

In Step 102, a temperature difference is determined according to a current temperature value of a cabinet and a preset temperature value of the cabinet. In an implementation, the preset temperature value may be subtracted from the current temperature value, or the current temperature value may be subtracted from the preset temperature value. In the present embodiment, the preset temperature value is subtracted from the current temperature value, so that the temperature difference may be positive or negative; and if the temperature difference is a positive number, it is indicated that a larger input air volume is required, and if the temperature difference is a negative number, it is indicated that a current input air volume is relatively large and the input air volume may be appropriately reduced.

In Step 104, an opening degree of an air valve of a variable air volume terminal device of the cabinet is controlled according to the temperature difference to regulate a magnitude of an air volume required by the cabinet.

According to the embodiment of the present disclosure, the temperature value to be regulated is determined according to the difference between the current temperature value and the preset temperature value, and the opening degree of the air valve of the variable air volume terminal device is accordingly regulated according to the temperature value to be regulated to regulate the air volume required by the cabinet so as to further regulate the air volume according to the actual demand, so that the problem that the main methods for controlling energy saving of the communication machine room in the prior art are focusing on the designs and layouts of air flow distribution of the machine room and cannot regulate the air volume according to the actual workload of the machine room is solved.

Before the temperature difference is determined according to the current temperature value of the cabinet and the preset temperature value of the cabinet, it is also necessary to acquire the current temperature value of the cabinet, which may be acquired by a temperature sensor according to a preset detection period or in real time. Real-time acquisition may determine the required air volume more accurately, but may bring a higher processing workload.

In an implementation, the step that the opening degree of the air valve of the variable air volume terminal device of the cabinet is controlled according to the temperature difference includes that: the opening degree of the air valve of the variable air volume terminal device of the cabinet is controlled by a variable universe adaptive fuzzy PID control method according to the temperature difference. Those skilled in the art know that different values of the air volume are required to eliminate different temperature differences so that a required value of the air volume may be determined according to different temperature differences.

After the opening degree of the air valve of the variable air volume terminal device of the cabinet is controlled according to the temperature difference, a magnitude relationship between the temperature difference of the cabinet and a preset threshold value may also be detected according to a preset detection period, wherein the preset threshold value is a range by which the temperature is allowed to change, and it is normal if the temperature rises or falls within the range and thus the regulation of the air valve is not needed; if the temperature difference is out of the range of the preset threshold value, the opening degree of the air valve of the variable air volume terminal device of the cabinet is increased or decreased to regulate a magnitude of a value of an input air volume; and if the temperature difference is within the range of the preset threshold value, the opening degree of the air valve of the variable air volume terminal device of the cabinet is maintained for the current detection period.

After the opening degree of the air valve of the variable air volume terminal device of the cabinet is controlled according to the temperature difference, a total air volume of the whole machine room may also be regulated by means of the respective air valves, that is, the opening degrees of the air valves of the variable air volume terminal devices of all cabinets being detected in the machine room are acquired; and the magnitude of the total air volume required by the machine room is regulated according to the opening degrees of respective air valves of variable air volume terminal devices.

After the magnitude of the total air volume required by the machine room is regulated according to the opening degrees of respective air valves of the variable air volume terminal devices, conditions such as an air valve position and an air speed may further be determined to further control the air volume of the machine room more properly. The procedure is as follows: a maximum $P_{max}$ for a valve position corresponding to the opening degree of each air valve of the variable air volume terminal device is acquired; a rotating speed of a fan is increased by a certain step length if $P_{max}>90\%$ (a first threshold value) and the rotating speed of the fan is lower than a maximum rotating speed; the rotating speed of the fan is reduced by a certain step length if $P_{max}<70\%$ (a second threshold value); and a current value of the air volume is maintained if $70\% \leq P_{max} \leq 90\%$.

Figure 2:
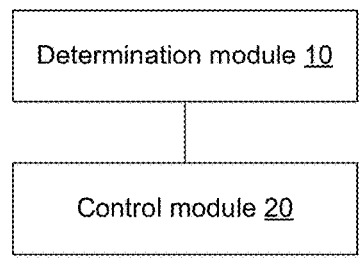
FIG. 2 is a schematic diagram of a first structure of a device for controlling an output air volume according to an embodiment of the present disclosure.

The embodiment of the present disclosure further provides a device for controlling an output air volume, the schematic diagram of which is shown in FIG. 2. The device includes: a determination module 10 which is configured to determine a temperature difference according to a current temperature value of a cabinet and a preset temperature value of the cabinet; and a control module 20 which is coupled to the determination module 10 and configured to control an opening degree of an air valve of a variable air volume terminal device of the cabinet according to the temperature difference to regulate an air volume required by the cabinet.

Figure 3:
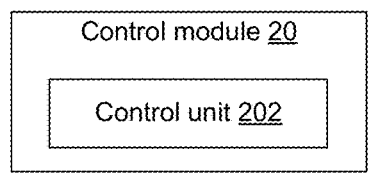
FIG. 3 is a schematic diagram of a structure of a control module of a device for controlling an output air volume according to an embodiment of the present disclosure.

FIG. 3 shows a schematic diagram of a preferred structure of the control module 20 which may include a control unit 202 configured to control the opening degree of the air valve of the variable air volume terminal device of the cabinet by a variable universe adaptive fuzzy PID control method according to the temperature difference.

Figure 4:
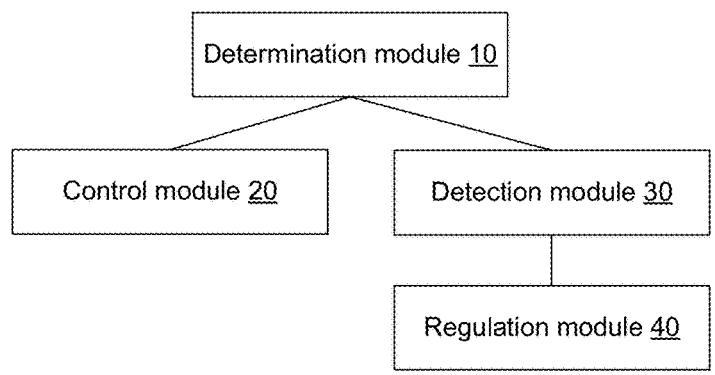
FIG. 4 is a schematic diagram of a second structure of a device for controlling an output air volume according to an embodiment of the present disclosure.

On the basis of FIG. 2, a schematic structure of the above described device for controlling the output air volume may, as shown in FIG. 4, further include: a detection module 30 which is coupled to the determination module 10 and configured to detect a magnitude relationship between the temperature difference of the cabinet and a preset threshold value according to a preset detection period, wherein the preset threshold value is a range by which the temperature is allowed to change; and a regulation module 40 which is coupled to the detection module 30, and configured to increase or decrease the opening degree of the air valve of the variable air volume terminal device of the cabinet to regulate a magnitude of a value of an input air volume if the temperature difference is out of the range of the preset threshold value, and to maintain the opening degree of the air valve of the variable air volume terminal device of the cabinet for the current detection period if the temperature difference is within the range of the preset threshold value.

Figure 5:
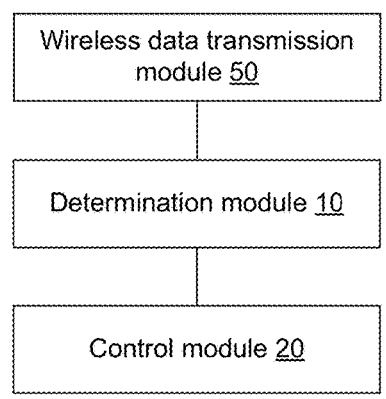
FIG. 5 is a schematic diagram of a third structure of a device for controlling an output air volume according to an embodiment of the present disclosure.

On the basis of FIG. 2, a schematic structure of the above described device for controlling the output air volume may, as shown in FIG. 5, further include: a wireless data transmission module 50 which is coupled to the determination module 10, and configured to acquire current temperature of the cabinet by a temperature sensor according to a preset detection period or in real time.

Preferred Embodiment

At present, when an air volume of a communication machine room is regulated, a required air volume cannot be accordingly regulated according to different real-time workloads of the cabinets. A variable air volume system is flexible in the control of heat-control area, and may timely regulate the air volume according to different real-time workloads of the cabinets. In view of a current situation of high energy consumption of the air conditioning equipment of the communication machine room, it is urgent to introduce a variable air volume system with a better energy saving effect for the machine room to the machine room.

In view of the above described problem and basis, the preferred embodiment of the present disclosure provides a method and device for controlling an output air volume of a variable air volume terminal device of a communication machine room, in which the problem that an air volume required in real time by the respective cabinets within the communication machine room cannot be effectively controlled in the prior art is solved by a variable universe adaptive fuzzy PID controller for a variable air volume terminal device.

According to the present embodiment, a wireless data transmission module is adopted to acquire current temperatures of an air outlets of respective cabinets in the communication machine room; for temperatures of cabinets which are the controlled objects, a difference between a temperature feedback value (a current temperature value of the cabinet) and temperature set value (preset temperature value) of each cabinet is acquired; an opening degree of a variable air volume terminal device air valve of a terminal device of each cabinet is controlled to obtain an air volume currently required by each cabinet according to the acquired temperature difference of each cabinet; and the opening degree of the air valve of the variable air volume terminal device of each cabinet is acquired, and a total air volume for running the system is regulated according to an overall states of the magnitudes of the opening degrees of the air valves. According to the technical solution provided by the present embodiment, the air volume required by each cabinet in the machine room is determined according to the temperature differences of the feedback values and set values of temperature of the air outlets of the cabinets, an air supply volume of the air conditioning equipment is regulated in real time, and energy consumption of the air conditioning equipment of the communication machine room is reduced.

In an implementation, temperature and humidity sensors are mounted at the air outlets of the cabinets. The current temperature of the air outlet of each cabinet is acquired through the temperature sensors, and then is acquired and uploaded to an upper computer by the wireless data transmission module. The difference between the temperature feedback value and temperature set value of each cabinet is calculated, and according to the difference, the opening degree of the variable air volume terminal device air valve of the terminal device of each cabinet is controlled to obtain the air volume currently required by each cabinet.

Furthermore, a variable universe adaptive fuzzy PID control method is adopted for controlling the opening degree of the air valve of the variable air volume terminal device, and the magnitudes of output air volume and the opening degree of the air valve are controlled by the temperature controller. Specifically, the variable universe adaptive fuzzy PID control method refers to that a universe is expanded along with increase of an error and is reduced along with reduction of the error under the condition of invariable universe fuzzy division. Reduction of the universe locally details fuzzy rules, and accordingly adds the fuzzy rules, thereby improving the control accuracy.

The variable universe fuzzy PID controller substantially introduces the concept of variable universe on the basis of a fuzzy PID controller such that a basic input and output universe is adaptively scaled and changed in real time along with a control requirement according to a certain criterion, so as to change fuzzy division defined in the basic universe accordingly and achieve the effect of improving control performance.

After the temperature difference of the air outlet of each cabinet is acquired, the opening degree of the variable air volume terminal device air valve of the terminal device of each cabinet is controlled and regulated to obtain the air volume currently required by each cabinet; and the opening degree of the air valve of the variable air volume terminal device of each cabinet is acquired, a maximum of a position of an air valve of each terminal device is read, and a rotating speed of an air conditioning fan is corrected according to a related rule.

A procedure for controlling variable air volume terminal device, a processing procedure employing PID control method and a method for controlling an air volume of an air conditioner of the communication machine room will be described below with reference to the drawings respectively.

Figure 6:
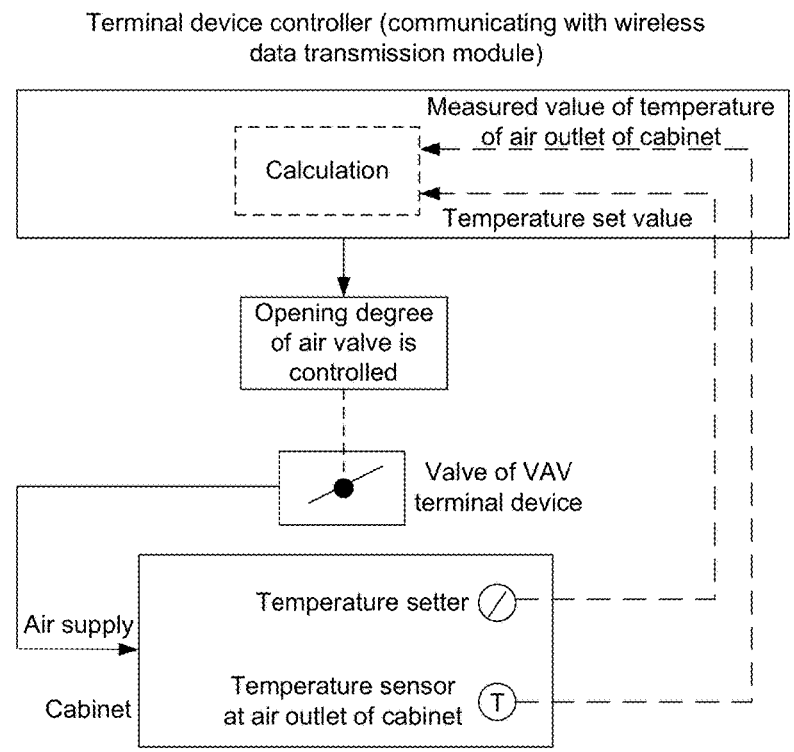
FIG. 6 is a schematic diagram of a principle for controlling a variable air volume terminal device according to a preferred embodiment of the present disclosure.

As shown in FIG. 6, the opening degrees of the air valves are regulated by a controller for a terminal device in order to change the air supply volume, the temperature sensors are mounted at the air outlets of the cabinets, and the temperature and valve position of the air outlet of each cabinet are returned by communication between the upper computer and the wireless data transmission module. The air valves are controlled by the controller for the terminal device according to signals of the difference between the measured value and set value of the temperature of the air outlets of the cabinets, and the opening degrees of the air valves are automatically regulated, thereby changing input air volumes of the cabinets to ensure that the temperature of the air outlets of the cabinets is maintained within a set range.

Figure 7:
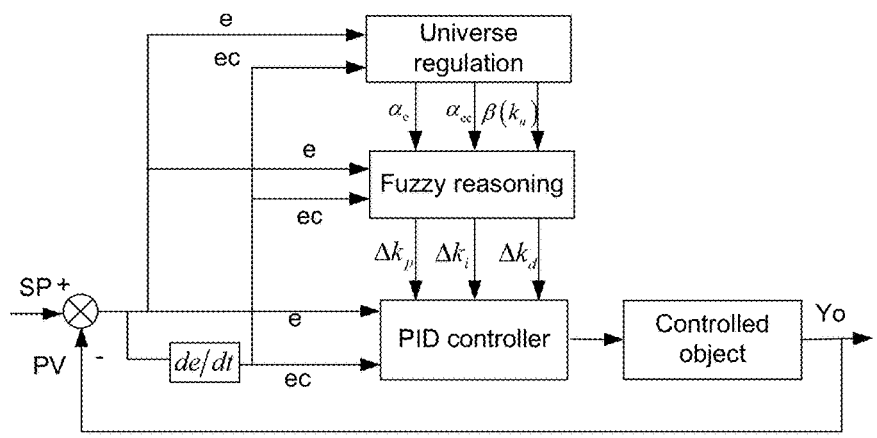
FIG. 7 is a schematic diagram of a PID control method-based processing procedure according to a preferred embodiment of the present disclosure.

As shown in FIG. 7, the difference e between the measured value and set value of the temperature of the air outlet of the cabinet and a variation rate ec for the difference are taken as inputs to the variable universe fuzzy PID controller, a variable universe fuzzy reasoning method is adopted, parameter corrections $\Delta K_p$, $\Delta K_i$ and $\Delta K_d$ are taken as outputs, a requirement for self-tuning PID parameter with e and ec at different moments may be satisfied, the corrected parameter values of the PID controller are calculated, and the opening degree of the air valve is automatically regulated, thereby changing the air supply volume of the cabinet to ensure that the temperature of the air outlet of the cabinet is maintained within the set range.

The control over the opening degree the air valve of the terminal device complies with the following rules:

$|SF-FF| \leq 1V, F\_action=1$ and $|SF-FF| \leq 1V, F\_action=0$, where SF represents a voltage signal of a valve position which is sent to an air valve executor by the upper computer, FF represents a voltage signal of a valve position which is fed back to the upper computer by the executor, and F_action represents whether to accept a next-round valve position control signal or not. A corresponding operation is performed according to whether an absolute value of a difference between SF and FF is more than a voltage value 1V or not, F_action=0 represents that the air valve executor has yet not reached a corresponding valve position, and F_action=1 represents that the air valve executor has reached the corresponding valve position and may accept the next-round valve position control signal.

Determination of a corrected rotating speed of the air conditioning fan complies with the following rules:

$P\max > 90\%$, $TF\_action=1$ $P\max < 70\%$, $TF\_action=1$ and $70 \leq P\max \leq 90\%$, $TF\_action=0$, where $P_{max}$ represents a maximum for valve position of the air valve of the variable air volume terminal device of each cabinet, TF_action represents a state of a frequency modulated operation of the air conditioning fan, TF_action=0 represents that a current air conditioning frequency value should not be changed, and TF_action=1 represents that the current air conditioning frequency value should be corrected according to a corresponding rule.

Figure 8:
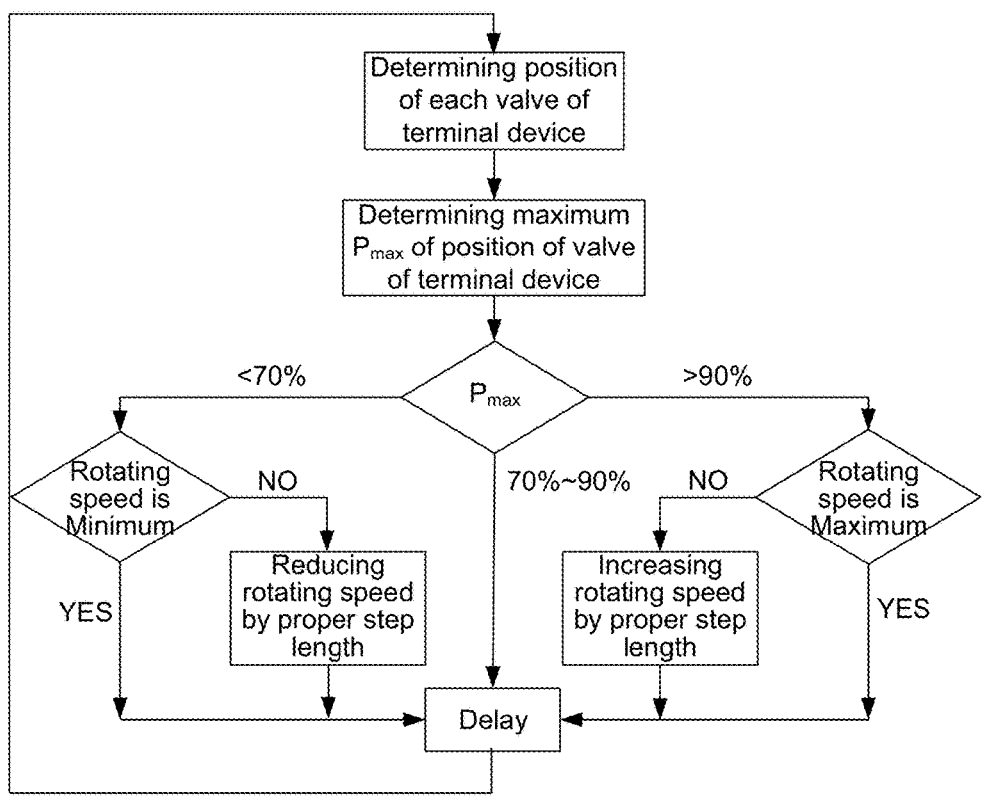
FIG. 8 is a flowchart of a method for controlling an air volume of an air conditioner of a communication machine room according to a preferred embodiment of the present disclosure.

The procedure of determining a position of each air valve of a variable air volume terminal device, reading the maximum of the position of each air valve of the terminal device and correcting the rotating speed of the air conditioning fan according to the related rule is shown in FIG. 8.

The position of each regulatable air valve of the variable air volume terminal device is determined, and the maximum $P_{max}$ of the position of each air valve of the terminal device is read; if $P_{max} > 90\%$, it is indicated that an air supply volume of the terminal device with the maximum valve opening degree $P_{max}$ can meet a load requirement of a controlled area under the total air supply volume of the current system; and the rotating speed of the fan needs to be increased by a certain step length if the rotating speed of the fan is not maximum at this moment; if $P_{max} < 70\%$, it is indicated that the opening degree of the maximum valve position is too small under the total air supply volume of the current system, the positions of the other air valves of the terminal device are even smaller and the total air supply volume of the system is slightly large, and the rotating speed of the fan needs to be decreased by a certain step length; and if $70\% \leq P_{max} \leq 90\%$, it is indicated that the air supply volume of the current system is appropriate, and the total air supply volume of the system need not to be changed.

According to the embodiment of the present disclosure, the current temperature of the air outlet of each cabinet in the communication machine room is monitored in real time, and is compared with the temperature set value corresponding to the air outlet of each cabinet to calculate the temperature difference therebetween, and the opening degree of the air valve of the variable air volume terminal device of each cabinet is controlled according to the acquired temperature difference of each cabinet to meet the air volume currently required by each cabinet, so that the problem of incapability in effectively controlling the air volume required in real time by each cabinet in the communication machine room in the relevant technologies is solved; and the air volume required by each cabinet is controlled in real time to regulate the air supply volume of the air conditioning equipment at any time, so that energy consumption of the air conditioning equipment of the communication machine room is reduced during partial loading of the machine room.

The embodiment of the present disclosure further provides a storage medium storing therein a computer program configured to execute the methods for controlling an output air volume according to the aforementioned embodiments.

Although the preferred embodiment of the present disclosure has been exemplarily disclosed, those skilled in the art may realize that various improvements, additions and replacements are possible, so that the scope of the present disclosure shall not be limited to the abovementioned embodiment.

INDUSTRIAL APPLICABILITY

According to the present disclosure, the temperature value to be regulated is determined according to the difference between the current temperature value and the preset temperature value, and the opening degree of the air valve of the variable air volume terminal device is accordingly regulated according to the temperature value to be regulated to regulate the air volume required by the cabinet to further regulate the air volume according to the actual demand, so that the problem that the main methods for controlling energy saving of the communication machine room in the prior art are focusing on the designs and layouts of air flow distribution of the machine room and cannot regulate the air volume according to the actual workload of the machine room is solved.

What is claimed is:

1. A method for controlling an output air volume used in a communication machine room with a plurality of cabinets, the method comprising:
    determining a temperature difference according to a current temperature value of an air outlet of each cabinet in the communication machine room and a preset temperature value of the cabinet; and
    controlling an opening degree of an air valve of a variable air volume terminal device of the cabinet according to the temperature difference, to regulate a magnitude of an air volume required by the cabinet;
    wherein the method further comprising: after controlling the opening degree of the air valve of the variable air volume terminal device of the cabinet according to the temperature difference,
    detecting whether the temperature difference is within a preset threshold range according to a preset detection period, wherein the preset threshold range is a range by which the current temperature value is allowed to change;
    adjusting the opening degree of the air valve of the variable air volume terminal device of the cabinet to regulate a magnitude of a value of an input air volume if the temperature difference is out of the preset threshold range; or
    maintaining a current opening degree of the air valve of the variable air volume terminal device of the cabinet unchanged for the current detection period if the temperature difference is within the range of the preset threshold range.

2. The method according to claim 1, wherein controlling the opening degree of the air valve of the variable air volume terminal device of the cabinet according to the temperature difference comprises:
    controlling the opening degree of the air valve of the variable air volume terminal device of the cabinet by a variable universe adaptive fuzzy Proportion Integration Differentiation (PID) control method according to the temperature difference.

3. The method according to claim 2, further comprising: before determining the temperature difference according to the current temperature value of the cabinet and the preset temperature value of the cabinet,
    acquiring a current temperature of the cabinet by a temperature sensor according to a preset detection period; or
    acquiring the current temperature of the cabinet in real time by the temperature sensor.

4. The method according to claim 3, further comprising: after controlling the opening degree of the air valve of the variable air volume terminal device of the cabinet according to the temperature difference,
    acquiring opening degrees of the air valves of the variable air volume terminal devices of all cabinets being detected in a machine room; and
    regulating a magnitude of a total air volume required by the machine room according to the opening degrees of the respective air valves of the variable air volume terminal devices.

5. The method according to claim 4, further comprising: after regulating the magnitude of the total air volume required by the machine room according to the opening degrees of the respective air valves of the variable air volume terminal devices,
    acquiring a maximum $P_{max}$ of valve positions corresponding to the opening degrees of air valves of the respective variable air volume terminal devices;
    increasing a rotating speed of a fan by a preset step length, if $P_{max}>$a first threshold value and the rotating speed of the fan is lower than a maximum rotating speed;
    reducing the rotating speed of the fan by to the preset step length, if $P_{max}<$a second threshold value; and
    maintaining a value of a current air volume, if the second threshold value$\leq P_{max} \leq$the first threshold value.

6. The method according to claim 1, further comprising: before determining the temperature difference according to the current temperature value of the cabinet and the preset temperature value of the cabinet,
    acquiring a current temperature of the cabinet by a temperature sensor according to a preset detection period; or
    acquiring the current temperature of the cabinet in real time by the temperature sensor.

7. The method according to claim 6, further comprising: after controlling the opening degree of the air valve of the variable air volume terminal device of the cabinet according to the temperature difference,
    acquiring opening degrees of the air valves of the variable air volume terminal devices of all cabinets being detected in a machine room; and regulating a magnitude of a total air volume required by the machine room according to the opening degrees of the respective air valves of the variable air volume terminal devices.

8. The method according to claim 7, further comprising: after regulating the magnitude of the total air volume required by the machine room according to the opening degrees of the respective air valves of the variable air volume terminal devices,
acquiring a maximum $P_{max}$ of valve positions corresponding to the opening degrees of air valves of the respective variable air volume terminal devices;
increasing a rotating speed of a fan by a preset step length, if $P_{max}$>a first threshold value and the rotating speed of the fan is lower than a maximum rotating speed;
reducing the rotating speed of the fan by to the preset step length, if $P_{max}$<a second threshold value; and
maintaining a value of a current air volume, if the second threshold value≤$P_{max}$≤the first threshold value.

9. The method according to claim 1, further comprising: after controlling the opening degree of the air valve of the variable air volume terminal device of the cabinet according to the temperature difference,
acquiring opening degrees of the air valves of the variable air volume terminal devices of all cabinets being detected in a machine room; and
regulating a magnitude of a total air volume required by the machine room according to the opening degrees of the respective air valves of the variable air volume terminal devices.

10. The method according to claim 9, further comprising: after regulating the magnitude of the total air volume required by the machine room according to the opening degrees of the respective air valves of the variable air volume terminal devices,
acquiring a maximum $P_{max}$ of valve positions corresponding to the opening degrees of air valves of the respective variable air volume terminal devices;
increasing a rotating speed of a fan by a preset step length, if $P_{max}$>a first threshold value and the rotating speed of the fan is lower than a maximum rotating speed;
reducing the rotating speed of the fan by to the preset step length, if $P_{max}$<a second threshold value; and
maintaining a value of a current air volume, if the second threshold value≤$P_{max}$≤the first threshold value.

11. The method according to claim 1, wherein adjusting the opening degree of the air valve of the variable air volume terminal device of the cabinet to regulate a magnitude of a value of an input air volume if the temperature difference is out of the preset threshold range comprises:
increasing the opening degree of the air valve of the variable air volume terminal device of the cabinet to regulate a magnitude of a value of an input air volume if the temperature difference is larger than an upper limit value of the range of the preset threshold range; or
decreasing the opening degree of the air valve of the variable air volume terminal device of the cabinet to regulate a magnitude of a value of an input air volume if the temperature difference is smaller than a lower limit value of the preset threshold range.

12. A device for controlling output air volume used in a communication machine room with a plurality of cabinets, the device comprising:
a determination module configured to determine a temperature difference according to a current temperature value of an air outlet of each cabinet in the communication machine room and a preset temperature value of the cabinet; and
a control module coupled to the determination module and configured to control an opening degree of an air valve of a variable air volume terminal device of the cabinet according to the temperature difference to regulate a magnitude of an air volume required by the cabinet;
wherein the device further comprises:
a detection module configured to detect whether the temperature difference is within a preset threshold range according to a preset detection period, wherein the preset threshold range is a range by which the current temperature value is allowed to change; and
a regulation module coupled to the detection module and configured to adjust the opening degree of the air valve of the variable air volume terminal device of the cabinet to regulate a magnitude of a value of an input air volume if the temperature difference is out of the preset threshold range, or to maintain a current opening degree of the air valve of the variable air volume terminal device of the cabinet unchanged for the current detection period if the temperature difference is within the range of the preset threshold range.

13. The device according to claim 12, wherein the control module comprises:
a control unit configured to control the opening degree of the air valve of the variable air volume terminal device of the cabinet by a variable universe adaptive fuzzy Proportion Integration Differentiation (PID) control method according to the temperature difference.

14. The device according to claim 13 further comprising:
a wireless data transmission module configured to acquire a current temperature of the cabinet by a temperature sensor according to a preset detection period; or to acquire the current temperature of the cabinet in real time by the temperature sensor.

15. The device according to claim 12 further comprising:
a wireless data transmission module configured to acquire a current temperature of the cabinet by a temperature sensor according to a preset detection period; or to acquire the current temperature of the cabinet in real time by the temperature sensor.

16. The device according to claim 12, wherein the regulation module is further configured to increase the opening degree of the air valve of the variable air volume terminal device of the cabinet to regulate a magnitude of a value of an input air volume if the temperature difference is larger than an upper limit value of the preset threshold range, or to decrease the opening degree of the air valve of the variable air volume terminal device of the cabinet to regulate the magnitude of the value of the input air volume if the temperature difference is smaller than a lower limit value of the preset threshold range.

17. A non-transitory storage medium storing therein a computer program configured to execute the method for controlling the output air volume used in a communication machine room with a plurality of cabinets, the method comprising:
determining a temperature difference according to a current temperature value of an air outlet of each cabinet in the communication machine room and a preset temperature value of the cabinet; and
controlling an opening degree of an air valve of a variable air volume terminal device of the cabinet according to the temperature difference, to regulate a magnitude of an air volume required by the cabinet;

wherein the method further comprises: after controlling the opening degree of the air valve of the variable air volume terminal device of the cabinet according to the temperature difference, detecting whether the temperature difference is within a preset threshold range according to a preset detection period, wherein the preset threshold range is a range by which the current temperature value is allowed to change;

adjusting the opening degree of the air valve of the variable air volume terminal device of the cabinet to regulate a magnitude of a value of an input air volume if the temperature difference is out of the range of the preset threshold range; or maintaining a current opening degree of the air valve of the variable air volume terminal device of the cabinet unchanged for the current detection period if the temperature difference is within the range of the preset threshold range.

18. The method according to claim 17, wherein adjusting the opening degree of the air valve of the variable air volume terminal device of the cabinet to regulate a magnitude of a value of an input air volume if the temperature difference is out of the preset threshold range comprises:

increasing the opening degree of the air valve of the variable air volume terminal device of the cabinet to regulate a magnitude of a value of an input air volume if the temperature difference is larger than an upper limit value of the range of the preset threshold range; or decreasing the opening degree of the air valve of the variable air volume terminal device of the cabinet to regulate a magnitude of a value of an input air volume if the temperature difference is smaller than a lower limit value of the preset threshold range.

* * * * *